United States Patent
Zimmermann et al.

(10) Patent No.: US 10,404,831 B2
(45) Date of Patent: Sep. 3, 2019

(54) METHOD AND A DEVICE FOR UPDATING THE CAPABILITIES OF AN OBJECT CONNECTED TO A COMMUNICATIONS NETWORK

(71) Applicant: Orange, Paris (FR)

(72) Inventors: Julien Zimmermann, Colombelles (FR); Emmanuel Bertin, Luc-sur-Mer (FR); Stéphane Cazeaux, Authie (FR)

(73) Assignee: ORANGE, Paris (FR)

( * ) Notice: Subject to any disclaimer, the term of this patent is extended or adjusted under 35 U.S.C. 154(b) by 279 days.

(21) Appl. No.: 15/189,986

(22) Filed: Jun. 22, 2016

(65) Prior Publication Data
US 2016/0381180 A1    Dec. 29, 2016

(30) Foreign Application Priority Data
Jun. 24, 2015 (FR) ...................... 15 55798

(51) Int. Cl.
*H04L 29/06* (2006.01)
*H04L 29/08* (2006.01)
*H04L 12/24* (2006.01)
*H04M 1/725* (2006.01)

(52) U.S. Cl.
CPC .............. *H04L 67/34* (2013.01); *H04L 41/20* (2013.01); *H04L 41/24* (2013.01); *H04L 67/10* (2013.01); *H04L 67/16* (2013.01); *H04L 69/24* (2013.01); *H04M 1/72525* (2013.01); *H04M 1/72527* (2013.01)

(58) Field of Classification Search
CPC ....................................................... H04L 67/34
See application file for complete search history.

(56) References Cited

U.S. PATENT DOCUMENTS

| | | | |
|---|---|---|---|
| 2002/0163895 A1* | 11/2002 | Haller | H04L 41/00 370/335 |
| 2009/0061776 A1* | 3/2009 | Takei | H04W 8/005 455/41.3 |
| 2009/0186668 A1 | 7/2009 | Rahman et al. | |

OTHER PUBLICATIONS

Preliminary Search Report dated Apr. 11, 2016 for French Application No. FR 1555798 filed Jun. 24, 2015.

* cited by examiner

*Primary Examiner* — Adnan M Mirza
(74) *Attorney, Agent, or Firm* — Knobbe, Martens, Olson & Bear, LLP

(57) ABSTRACT

One embodiment relates to a method performed by a first object connected to a communications network. The method may comprise using the communications network to supply information representative of the capabilities of the first object, these capabilities comprising capabilities associated with an execution environment of the first object. The method may comprise receiving via the communications network information representative of the capabilities of a second object connected to the communications network, the information identifying at least one function performed by the second object. The method may also comprise obtaining a software module adapted to the first object and suitable for executing in the execution environment of the first object while using data exchanged with the second object a function performed by the second object.

17 Claims, 1 Drawing Sheet

METHOD AND A DEVICE FOR UPDATING THE CAPABILITIES OF AN OBJECT CONNECTED TO A COMMUNICATIONS NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, the disclosure of French Patent Application FR 1555798, filed Jun. 24, 2015, is incorporated herein by reference in its entirety.

BACKGROUND OF THE INVENTION

Field of the Invention

Some embodiments relate to the general field of communications systems.

In particular, some embodiments relate to the upgradeability of such communications systems.

Description of the Related Art

Numerous communications systems are designed around physical or virtual links between various pieces of equipment or "objects". These pieces of equipment communicate with one another by using standardized or proprietary physical data exchange protocols. Thus, by way of example, an audio/video communications system comprises a computer or processor unit, that depends on an operating system, together with various peripherals that are physically connected to the system.

The lifetime of such a system is typically associated with the ability of its pieces of equipment to keep up with technological advance. A close association exists between the various pieces of equipment as from the initial design of the system, which complicates the task of upgrading the system, e.g. in order to add new capabilities.

SUMMARY OF THE INVENTION

Some embodiments enable this situation to be improved by proposing a solution that relies on connected objects. In known manner, such objects are hardware and/or software devices connected to a communications network, e.g. to the public Internet, and in this way they are capable of communicating with other systems in order to obtain and/or supply information. No limitation is put on the nature of these objects, which may for example be a telephone, a printer, a screen, a sensor, a microphone, a software application, etc., nor is any limitation put on the way in which these objects are connected to the network (e.g. a wired connection, by radio, etc.).

More precisely, some of the embodiments described herein provide a method of updating the capabilities of a first object connected to a communications network, the method being designed to be performed by the first object and comprising:

using the communications network to supply information representative of the capabilities of the first object (e.g. hardware and/or software resources of the first object and enabling it to perform its function(s), the languages it supports, an identifier, etc.), these capabilities comprising capabilities associated with an execution environment of the first object;

receiving via the communications network information representative of the capabilities of a second object connected to the communications network (e.g. hardware and/or software resources of the second object and enabling it to perform its function(s), the languages it supports, an identifier, etc.), said information identifying at least one function performed by the second object; and obtaining a software module adapted to the first object and suitable for executing in the execution environment of the first object while using data exchanged with the second object a function performed by the second object.

Some embodiments relate to a device for updating the capabilities of a first object connected to a communications network, the device being for integrating in the first object and comprising:

a supply module configured to use the communications network to supply information representative of the capabilities of the first object, said capabilities comprising capabilities associated with an execution environment of the first object;

a reception module configured to use the communications network to receive information representative of the capabilities of a second object connected to the communications network, this information identifying at least one function performed by the second object; and an obtaining module configured to obtain a software module adapted to the first object and suitable for executing in the execution environment of the first object while using data exchanged with the second object a function performed by the second object.

The term "suitable for executing in the execution environment of the first object a function of the second object" is used to mean that the function of the second object as executed by the software module, makes use of primitives of the execution environment of the first object, i.e. the software module comprises a code that runs in the execution environment of the first object. No limitation is put on the nature of the function being executed, it may equally well be a hardware function or a software function.

Thus, not only does the software module communicate with the second object in order to send it a command to execute the function, but the software module is genuinely suitable for executing this function locally on the first object while interfacing with the second object in order to exchange data therewith. Thus, while the function is being executed locally on the first object, it is as though the first object had a portion of the second object available to it locally (internally). Nevertheless, instead of this function being provided internally to the first object from the beginning, some embodiments enable the first object to acquire the function dynamically.

In other words, in some embodiments, the first object recovers a module (i.e. execution automaton or state machine) for executing the function of the second object, which module reproduces all of the service logic of the second object (in other words all of the routines and the primitives giving access to the hardware and software resources of the second object and that enable it to perform its function). It does not merely recover an address for communicating with the second object, as in the presently-existing state of the art that relies on enabling the connected-together objects to communicate with each other. Thus, when the second object is used, an event is returned to the software module installed on the first object, and all of the service logic associated with that event and enabling progress of the state of the second object to be managed is performed locally in the first object.

Exchanging the capabilities of the two objects makes it possible:

for the first object to identify the resources and the function(s) performed by the second object; and for the second object to select a software module for downloading to the first object and that is adapted thereto (e.g. compatible with a language supported by the first object or with the execution environment of the first object).

For example, the information representative of the capabilities of the second object is received in response to supplying information representative of the capabilities of the first object, and includes a reference of said at least one function giving access to the software module adapted to the first object. In particular, the software module adapted to the first object may be selected by the second object on the basis of the capabilities associated with the execution environment of the first object as supplied by the first object.

Thus, some embodiments make it possible for the capabilities of a connected first object to be enriched easily with the capabilities of a second object via a communications network. This enrichment can easily be reproduced indefinitely by the first object with a third object, a fourth object, etc., the execution environment of the first object becoming an environment in which a plurality of software modules can be run in parallel, preferably in leaktight manner (i.e. without interaction between the modules).

The various objects under consideration may for example be unitary elements (i.e. performing a single main function, such as for example measuring a temperature for a temperature sensor, displaying a video stream or an image for a screen, etc.). In some embodiments, the functions of the various objects can be combined in time so as to provide an enriched service relying on the service logic and the execution environment of the first object. These objects may advantageously be upgraded, be replaced, etc.

In a variant, certain objects under consideration may be capable of performing a plurality of functions. In this variant, the information representative of the capabilities of the second object then identifies a plurality of functions performed by the second object, and the method includes a process of the first object selecting at least one function from said plurality of functions, the software module obtained during the obtaining process being suitable for executing in the execution environment of the first object said at least one function selected during the selection process.

This enrichment thus makes it easy to design communications systems on-the-fly that are modular, upgradeable, and collaborative. Thus, the ability of such systems to be upgraded is unlimited.

An example application is a modular video conference system made up from a central node unit (CNU) comprising a docking station having connected thereto a keyboard, a hands-free kit, and a webcam type camera, etc. via a web communications bus. Naturally, this example is given purely by way of illustration and other systems can be devised from objects that may be unitary or otherwise.

The market for connected objects is currently growing strongly. Nevertheless, although new connected objects are appearing daily for new uses, actors in the market are agreed that there still does not exist an outlook that is reliable over time, nor does there exist any associated revenue plan. Connected objects are provided that are functional and operational in a given reference frame, but most of them then quickly become obsolete and are difficult to upgrade. Some embodiments described herein provide a genuine prospect for these connected objects being used and upgraded. Thus, it is possible to devise communications systems having as many capabilities as it has objects with different capabilities connected thereto. These systems may also be developed by relying on a shared approach in which distinct users can contribute to enriching such systems by developing software modules that are simple and highly monetizable.

Some embodiments described herein can also be applied to various sectors of activity relying on telecommunications (e.g. the automobile industry, robotics, etc.) and enabling objects that were not initially planned to become federated within a system.

In a particular implementation, the software module adapted to the first object is obtained directly from the second object. In particular, it may be developed by the designer of the second object and stored in a memory of the second object.

In a variant, the software module may be downloaded from an address contained in the information representative of the capabilities of the second object.

In another implementation, the data exchanged between the first object and the second object while executing the function complies with an Internet protocol (IP).

This implementation is particularly advantageous since the Internet protocol is a universal protocol, commonly in use by connected objects.

By way of example, the software module may be a software module designed in a web language such as the Javascript language, capable of being executed easily in a browser of the first object. In a variant, any language may be used providing it is supported by the execution environment of the first object (e.g. an executable binary file, etc.). Because the second object discovers the capabilities of the first object, the second object is capable of specifying a software module that is compatible with the capabilities of the first object.

In a particular implementation, the updating method further includes a process of pairing the first object with the second object.

This pairing process makes it possible to make exchanges between the two objects secure and to ensure that the objects are mutually compatible. It enables the objects that are going to be associated to be verified.

In an implementation, this pairing process is based on identification/authentication of the objects (e.g. by possessing a shared secret or by an asymmetric key mechanism) or it is based on their proprietor (e.g. by a proof of authentication at application level via an identity management mechanism such as OpenID Connect).

In another implementation, the updating method further comprises:

on receiving a request, activating the software module so as to execute the function of the second object; and supplying a response to the request obtained while the software module is executing the function of the second object.

The first object is thus capable of responding to requests made thereto by associating itself with and executing the functions of the second object even though the functions were not initially provided in the service logic of the first object.

In a particular implementation, the updating method further comprises:

updating information about the capabilities of the first object with the function of the second object; and using the communications network to supply this updated information.

In other words, the first object incorporates amongst its capabilities the functions of the second object and it publishes them as such to other objects connected to the network.

In a particular implementation, the data is supplied by the second object to the software module of the first object in response to a request from the software module and/or at the initiative of the second object.

These various modes of operation provide flexibility for the operations that can be performed by the software module and that rely on the function of the second object.

In a particular implementation, the various processes of the updating method are determined by computer program instructions.

Consequently, some embodiments described herein also provide a computer program on a data medium, the program being suitable for being performed by an updating device or more generally by a computer, the program including instructions adapted to performing an updating method as defined above.

The program may use any programming language, and be in the form of source code, object code, or code intermediate between source code and object code, such as in a partially compiled form, or in any other desirable form.

Some embodiments also provide a computer readable data medium including instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal suitable for being conveyed via an electrical or optical cable, by radio, or by other means. The program may in particular be downloaded from a network of the Internet type.

Alternatively, the data medium may be an integrated circuit in which the program is incorporated, the circuit being suitable for executing or being used in the execution of the method in question.

In another aspect, some embodiments also provide a method of communicating with a first object as performed by a second object, the first and second objects being connected to a communications network, the method comprising:

using the communications network to receive information representative of the capabilities of the first object, these capabilities comprising capabilities associated with an execution environment of the first object;

using information representative of the capabilities of the first object to select a software module adapted to the first object and suitable for executing in the execution environment of the first object while making use of data exchanged with the second object at least one function performed by the second object; and using the communications network to supply information representative of the capabilities of the second object, said information identifying said at least one function performed by the second object and comprising a reference giving access to the software module adapted to the first object and suitable for executing said at least one function.

Correspondingly, some embodiments also provide a communications device integrated in a second object for communicating with a first object, the first and second objects being connected to a communications network, the communications device integrated in the second object comprising:

a reception module for using the communications network to receive information representative of the capabilities of the first object, these capabilities comprising capabilities associated with the execution environment of the first object;

a selection module for using information representative of the capabilities of the first object to select a software module adapted to the first object and suitable for executing in the execution environment of the first object while using data exchanged with the second object at least one function performed by the second object; and a supply module using the communications network to supply information representative of the capabilities of the second object, the information identifying said at least one function performed by the second object and including a reference giving access to the software module adapted to the first object and suitable for executing said at least one function.

Some embodiments also provide a communications system comprising a plurality of objects connected to a communications network, at least one of said objects including an updating device as described herein and at least one of said objects including a communications device as described herein.

The communications method and device and also the system benefit from the same advantages as those mentioned above for the updating method and device.

In other configurations, it is also possible to envisage that the updating method, the updating device, the communications method, the communications device, and the communications system present in combination some or all of the above-specified characteristics.

BRIEF DESCRIPTION OF THE DRAWINGS

Other characteristics and advantages of some embodiments described herein appear from the following description made with reference to the accompanying drawing, which shows an implementation having no limiting character. In the figures.

DETAILED DESCRIPTION OF THE PREFERRED EMBODIMENT

Figure 1:
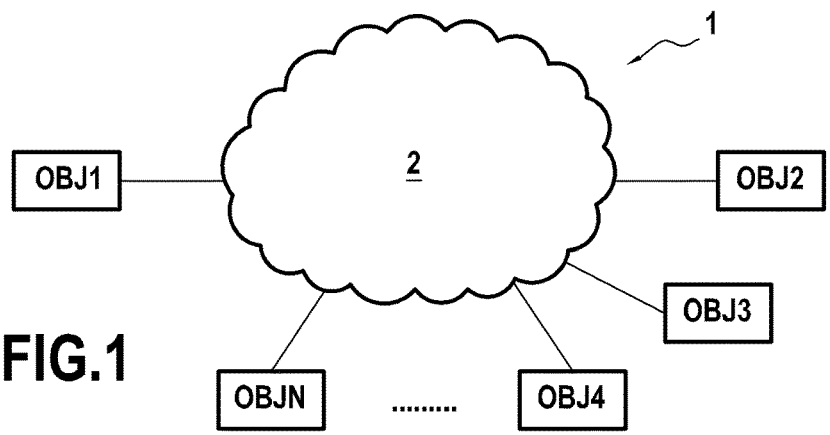
FIG. 1 shows a communications system in accordance with a particular embodiment.

FIG. 1 shows a particular embodiment of a communications system 1 in its environment.

The communications system 1 comprises a plurality of objects OBJ1, OBJ2, . . . , OBJN, where N is an integer greater than 1, which objects are connected to a telecommunications network 2. By way of example, the telecommunications network 2 is the public Internet.

Nevertheless, this assumption is not limiting and other telecommunications networks 2, such as for example a local network or a proprietary network may also be utilized. In addition, no limitation is put on the way in which the objects OBJ1, OBJ2, . . . , OBJN are connected to the network 2:

they may be connected via a wired or wireless connection, a mobile or fixed access network, etc.

Nor is any limitation put on the nature of the objects OBJ1, OBJ2, . . . , OBJN forming parts of the communications system 1. By way of example, they may comprise a keyboard, a printer, a screen, a hands-free kit, a sensor, a docking station, a mobile terminal, a software application, a server in a "cloud" computer system, etc.

Figure 2:
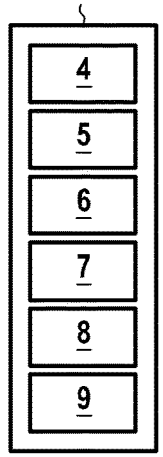
FIG. 2 shows the functional architecture of objects constituting the communications system of FIG. 1, in a particular embodiment.

As shown in FIG. 2, in the presently-described embodiment, each of these objects constitutes a unitary brick 3 of the communications system 1, said brick comprising the following functional elements:

a security unit 4 for ensuring that exchanges with the unitary brick 3 on the network 2 are made securely, the unit being suitable for performing an authentication authorization accounting (AAA) computer security protocol that performs an authentication, authorization and traceability function. Such a unit is itself known and is not described in greater detail herein;

a service logic unit 5 configured to perform service logic associated with the unitary brick 3 (in other words the function(s) performed by the object, e.g. displaying for a screen, sending sound for a microphone, measuring temperature for a temperature sensor, etc.). In the presently-described embodiment, the service logic unit 5 is also configured to broadcast over the network 2 or to a particular object an inventory of the (hardware and/or software) capabilities of the unitary brick 3. The term "capabilities" is used herein to refer not only to the function(s) performed by the unitary brick 3 (e.g. a headset function for a hands-free kit) and its service logic unit 5, but also to certain software and hardware characteristics and/or constraints, or indeed properties of the unitary brick 3, which may be static and/or dynamic, e.g. such as the languages and/or protocols supported by the unitary brick, the installed libraries, the type of execution environment that it implements, the hardware elements on which the functions performed by the objects rely, the location of the object, the power of its central processor unit (CPU), the amount of battery available, the identifier of the proprietor of the object (if known), etc.;

an execution environment 6, e.g. comprising a web browser or any other type of execution environment, depending on the object under consideration and its designer/operator;

a unit 7 for searching and discovering objects connected to the network 2 and their capabilities;

a data transfer unit 8 (for use in the upload direction and/or in the download direction);

a network communications unit 9 for communicating over the network 2; and a processor unit 10 for processing requests transmitted to the unitary brick 3 via, the network 2.

Figure 3:
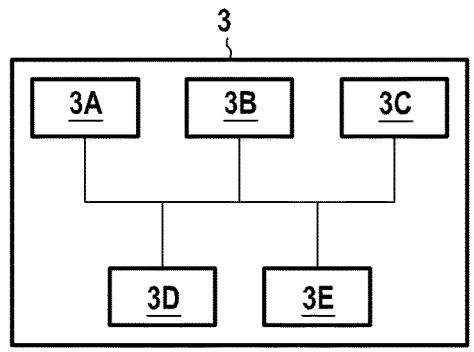
FIG. 3 shows the hardware architecture of objects constituting the communications system of FIG. 1, in a particular embodiment.

In order to implement these various functional units, each unitary brick 3 in this example relies on the hardware architecture of a computer, as shown in FIG. 3. A unitary brick 3 thus comprises in particular a processor 3A, a random access memory (RAM) 3B, a ROM 3C, a rewritable non-volatile memory 3D serving in particular to store information relating to the capabilities of the unitary brick 3, and a communications module 3E for communicating over the communications network 2, as relied on, in particular by the data transfer unit 8 and the network communications unit 9. By way of example, the communications module 3 comprises a well-known network card.

In the presently-described embodiment, each unitary brick 3 incorporates an updating device as described herein. The ROM 3C of each brick constitutes more precisely a data medium as described herein that is readable by the processor 3A and that stores a computer program including instructions for executing processes of an updating method as described herein. The computer program defines in equivalent manner the functions of certain functional units among the above-described units 4 to 10.

Likewise, in the presently-described embodiment, each unitary brick 3 incorporates a communications device as described herein. More precisely, the ROM 3C of each brick constitutes a data medium that is readable by the processor 3A and that stores a computer program including instructions for executing a communications method as described herein.

Figure 4:
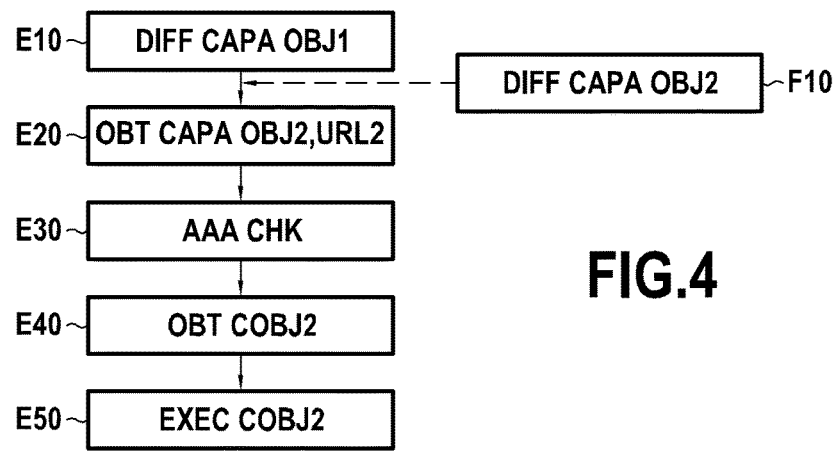
FIG. 4 is a flow chart showing the main processes of an exemplary updating method.

As mentioned above, some embodiments make it possible for the capabilities of a communications system to be designed dynamically and for them to be enriched simply, by associating the capabilities of a plurality of optionally unitary objects with that system. With reference to FIG. 4, there follows a description of the main processes performed in an exemplary embodiment in order to proceed with such enrichment. In the example shown in FIG. 4, the capabilities of the object OBJ1 are to be enriched with the functions performed by other objects of the communications system 1, and more particularly in this example with functions performed by the object OBJ2. Nevertheless, there is no limit put on the number of objects that may be taken into consideration, and the capabilities of the object OBJ1 or of other objects of the communications system 1 may be enriched indefinitely using functions provided by other objects, as shown below.

Purely by way of illustration, in the presently-described example, the object OBJ1 is any terminal (e.g. a mobile terminal performing the function of a telephone handset proper) that performs the function of a central node unit (CNU) having capabilities that the user seeks to increase, while the object OBJ2 that the user seeks to connect (i.e. associate) with the object OBJ1 is a hands-free kit (headset). In this example, the object OBJ1 performs the updating method as described herein, while the object OBJ2 performs the communications method as described herein.

The object OBJ1 informs the other objects of the communications system 1 about its capabilities (process E10), i.e. it announces its capabilities.

To this end, in the presently-described implementation, the service logic unit 5 broadcasts a message over the network 2 via the communications unit 9, this message containing an inventory of the capabilities of the object OBJ1 (in particular identifying its CNU function and the languages that it supports) together with references to its capabilities. One such reference may for example be an identifier, and/or an address (e.g. a uniform resource locator (URL)) giving access to the capability under consideration, etc. For example, among the capabilities of the object OBJ1, the unit 5 broadcasts:

capabilities in association with the properties proper of the object, e.g. static properties such as the function of the object, or an identifier of the object, and/or dynamic properties such as an identifier of the proprietor of the object (if known), the location of the object, etc.; and capabilities associated with the execution environment 6 of the object, e.g. static properties such as the language(s) it supports, the libraries it has installed, the power of its CPU, and/or dynamic properties such as the available battery level, etc.

By way of example, broadcasting the capabilities of the object OBJ1 over the network 2 is triggered on command of the user of the object OBJ1 (e.g. using an appropriate button or a selection from a menu).

The object OBJ2 receives and analyzes the message broadcast by the object OBJ1 by means of its search and discovery unit 7: specifically in this example, it extracts from the message broadcast by the object OBJ1 the languages that are supported by the object OBJ1 and by its execution environment 6. The object OBJ2 responds to this message via its service logic unit 5 by broadcasting in turn and in similar manner over the network 2, an inventory of its own capabilities (identifying in particular the function(s) that it perform(s)) and the references to its capabilities (using the same typology as used by the object OBJ1 for broadcasting its capabilities, except that the capabilities broadcast by the object OBJ2 may be different in number and/or kind) (process F10). In particular, among its capabilities, it specifies its hands-free kit function, and as a reference for this function it supplies an address URL2 giving access to a software module COBJ2 suitable for executing this function in the execution environment 6 of the object OBJ1. The software module COBJ2 is selected by the object OBJ2 as a function of the languages supported by the object OBJ1 and by its execution environment 6 as extracted by the object OBJ2 while analyzing the message broadcast by the object OBJ1. In the presently-described implementation, the object OBJ2 also broadcasts in the message a certificate that has been given thereto by a trusted authority and the encryption keys needed for setting up secure exchanges with the object OBJ1.

The software module COBJ2 is adapted to the first object OBJ1 and more particularly to its execution environment 6 and to the languages it supports. It is programmed so as to make use of the primitives of the execution environment 6 in the object QBJ1. Thus, by way of example, if the execution environment 6 of the object OBJ1 is a web browser, the software module COBJ2 to which the object OBJ2 refers in its response message to the object OBJ1 is a Javascript software module COBJ2 that can be executed from the web browser of the object OBJ1. In a variant, other versions of the software module COBJ2 in other languages may be envisaged and developed by the designer of the software object OBJ2 so as to be capable of adapting to different execution environments. Thus, by way of example, if the object OBJ1 is a mobile terminal, the software module COBJ2 may be in the form of an executable (.exe), an apk code, a binary code, etc.

In a particular implementation, the execution environment 6 of the object OBJ1 is an environment for executing containers, and the software module COBJ2 is the code of a container that is executable in the module, e.g. in the Docker format.

The software module COBJ2 has all of the service logic of the object OBJ2 associated with its hands-free kit function. The term "service logic" is used to cover the execution automaton (state machine) the function of the object OBJ2, or in other words the various operations performed by the object OBJ2 in the context of its hands-free kit function in this example, and making use of appropriate commands to the hardware and/or software elements of the object OBJ2 (headset, microphone). This service logic is programmed to execute by making use of primitives of the execution environment 6 of the object OBJ1 while making use of the hardware and software resources of the object OBJ2 that enable it to perform its hands-free kit function, in other words while communicating with the object OBJ2 and exchanging data therewith in order to perform this function. This communication may be performed by using application programming interface (API) type interfaces of the object OBJ2 that are incorporated in the software module COBJ2.

The software module COBJ2 may also include other operations in addition to the service logic of the object OBJ2. For example, for a temperature sensor type object, and on receiving a temperature request, the service logic consists in responding by giving the measured temperature. By way of example, an additional operation may consist in periodically sending such a request. In another example, for a hands-free kit, the software module COBJ2 may have various software mechanisms for processing audio (e.g. codecs, echo canceling, etc.) enabling it to take best advantage of the hands-free kit by using proprietary mechanisms. In other words, the software module serves not only to provide the hardware capabilities of the hands-free kit to the object OBJ1, but also to provide software that is more elaborate and that implements mechanisms enabling it to take advantage of those capabilities.

The object OBJ1 receives the message broadcast by the object OBJ2 and then makes use of its own search and discovery unit 7 to listen to and analyze the message: in particular, in this example, it extracts from the message broadcast by the object OBJ2 the address URL2 of the software module COBJ2 (process E20), the encryption keys, and the certificate of the object OBJ2.

Thereafter, the object OBJ1 uses its security unit 4 to perform a pairing procedure with the object OBJ2 by using the certificate and the encryption keys as extracted from the response of the object OBJ2 (process E30). In this example, this procedure relies on the known AAA protocol, which is not described in detail herein. It seeks to verify that the objects OBJ1 and OBJ2 are indeed compatible in the sense that they are authorized to associate with each other and to communicate. This pairing also makes it possible to establish a secure channel between the objects OBJ1 and OBJ2 via the communications network 2. It is carried out by a sequence of exchanges in known manner between the security unit 4 of the object OBJ1 and the security unit 4 of the object OBJ2.

In a particular implementation, this pairing process is based on identification/authentication of the objects (e.g. by possessing a shared secret or by an asymmetric key mechanism) or of their proprietor (e.g. by proof of authentication at application level via an identity management mechanism such as OpenID Connect), performed by the security unit 4 of the objects.

At the end of this pairing, the object OBJ1 has used its data transfer unit 8 to obtain the software COBJ2 making use of the address URL2 supplied by the object OBJ2 (process E40).

In a variant, the software module COBJ2 is stored in a memory of the object OBJ1 (e.g. its non-volatile memory 3D), and is sent by the object OBJ2 on request of the object OBJ1 to the data transfer unit 8 of the object OBJ2, via the network 2. In yet another variant, this sending is performed without requiring a request from the object OBJ1 at the end of pairing.

The software module COBJ2 is stored in the memory of the object OBJ1, e.g. in its non-volatile memory 3D and it is installed in the execution environment 6 of the object OBJ1 in order to be executed therein (process E50).

Executing the software module COBJ2 in the execution environment 6 of the object OBJ1 enables the OBJ1 to execute the function of the object OBJ2, in other words in this example the hands-free kit function, by making virtual use of the resources (capabilities) of the object OBJ2 by exchanging data with the object OBJ2 over a secure link set up over the network 2 as a result of the pairing performed beforehand between the two objects. The two objects can now easily communicate with each other, e.g. via a proprietary protocol delivered by the designer of the object OBJ2, using the software module COBJ2 executed in the execution environment 6 of the object OBJ1. This protocol preferably relies on the Internet protocol (IP) and on the transport control protocol (TCP) or the user datagram protocol (UDP). Nevertheless, other protocols could naturally be envisaged in a variant.

By way of example, the data exchanges between the two objects OBJ1 and OBJ2 may be linked to requests sent by the object OBJ1 e.g. to obtain information about the state of the resources of the object QBJ2, or to commands sent by the service logic unit 5 of the object OBJ1 in the context of the function of the object OBJ2 that it is carrying out. Thus, by way of example, on receiving a request relating to the function of the object OBJ2 made by the request processor unit 10 of the object OBJ1 (e.g. utilization of the hands-free kit), the service logic unit 5 of the object OBJ1 activates the software module COBJ2 so as to execute the function of the object OBJ2 and so that during this execution, it obtains and supplies during this execution a response to the received request.

The data exchanges between the two objects OBJ1 and OBJ2 may also be at the initiative of the object OBJ2. For example, they may involve events that have been detected and reported by the object OBJ2 to the execution automaton (state machine) being executed by the software module COBJ2, etc.

In order to better understand the operation of some embodiments described herein, it is assumed by way of illustration that the handset of the object OBJ2 is taken off-hook. With the object OBJ1 executing the service logic of the object OBJ2, an event associated with this action is returned to the software module COBJ2 and then to the service logic unit 5 of the object OBJ1, which manages the progression of states of the object OBJ2 by means of the function (execution automaton or state machine) implemented in the software module COBJ2. The exchanges between the execution automaton (state machine) of the software module COBJ2 and the service logic unit 5 of the object OBJ1 are performed locally in the object OBJ1, even though they rely on exchanges of data with the object OBJ2, which physically possesses the resources enabling the function of the object OBJ2 to be executed. In other words, it is as though the object OBJ1 virtually possesses the hardware resources (and possibly software resources) of the object OBJ2, but it is the object OBJ1 that executes all of the service logic associated with the function of the object OBJ1 (managing automatons/state machines, etc.).

In a particular implementation, at the end of process E50, the object OBJ1 updates the information (e.g. the list) relating to its capabilities so as to include therein the capabilities of the object OBJ2, which are now virtually attached thereto. It is this updated information including the capabilities of the object OBJ2 that is then broadcast over the network 2 when the object OBJ1 informs the other objects connected to the network of its capabilities.

It should be observed that in the examples described in detail herein, each object implements at least one function, and the service logic that enables said at least one function to be executed is taken up (i.e. implemented) in a single software module. In a variant, the capabilities of the object OBJ2 may identify a plurality of functions performed by the object OBJ2, it being possible for the service logic enabling these various functions to be executed to be taken up in one or more software modules. The updating method performed by the object OBJ1 may then include a process of the object OBJ1 selecting at least one function from said plurality of functions identified by the object OBJ2, and the software module that is obtained during the obtaining process is then suitable for executing in the execution environment of the object OBJ1 said at least one function selected during the selection process.

In some embodiments, the method may naturally be reproduced several times over with other objects.

Thus, by way of example, it is possible to envisage in the presently-described example that the first object OBJ1 is connected to a third object OBJ3 of the docking station type in order to charge the mobile terminal and with a fourth object OBJ4 of the softphone type for installing locally on the object OBJ1.

In this example, the processes E10 to E50 for connecting together the objects OBJ1 and OBJ3 are reproduced in a manner identical to that described above for connecting together the objects OBJ1 and OBJ2. At the end of these processes, the object OBJ1 runs in its own execution environment 6 a software module COBJ3 adapted to the first object and suitable for executing in this environment the function of the third object OBJ3 (i.e. charging a terminal) while using data exchanged with the third object OBJ3.

In order to connect the object OBJ4 to the object OBJ1, the processes E10 to E50 are performed, this time giving the role of the object OBJ1 to the object OBJ4 and the role of the object OBJ2 to the object OBJ1. Thus, after discovering the capabilities of the two objects and after they have been paired, the object OBJ4 obtains a software module COBJ1 suitable for executing the function of the object OBJ1 in the execution environment 6 of the object OBJ4. In other words, at the end of the process E50, the service logic of the object OBJ4 locally runs the software module COBJ1 in the object OBJ4 and executes the function associated with the object OBJ1. The service logic of the object OBJ4 thus carries out the softphone functions in the object OBJ4, while the object OBJ1, by virtue of its connection with the objects OBJ2 and OBJ3, carries out the functions of a hands-free headset and of recharging the mobile telephone. It should be observed that in the presently-described example, the interactions between the object OBJ1 and the object OBJ4 take place locally, within the terminal.

It is thus possible to combine indefinitely the capabilities of a variety of unitary objects (i.e. objects that implement at least one function) and to set up easily upgradeable systems that rely on connected objects.

What is claimed is:

1. A method of updating the capabilities of a first object connected to a communications network, the method being performed by the first object and comprising:

using the communications network to supply information representative of the capabilities of the first object, the capabilities of the first object comprising capabilities associated with an execution environment of the first object;

receiving via the communications network information representative of the capabilities of a second object connected to the communications network, the information identifying at least one function of the second object, the at least one function being executable at the second object by an execution automaton programmed to make use of the resources of the second object that enable the second object to perform the at least one function; and obtaining a software module adapted to the first object and configured to execute in the execution environment of the first object the at least one function of the second object while using data exchanged with the second object, the software module comprising an execution automaton suitable for executing the at least one function in the execution environment of the first object while using data exchanged with the second object reproducing service logic of the second object that gives access to the resources of the second object that enable the second object to perform the at least one function at the second object.

2. The method according to claim 1, wherein the information representative of the capabilities of the second object is received in response to supplying the information representative of the capabilities of the first object, and includes a reference of the at least one function giving access to the software module adapted to the first object.

3. The method according to claim 1, wherein the software module adapted to the first object is selected by the second object on the basis of the capabilities associated with the execution environment of the first object supplied by the first object.

4. The method according to claim 1, wherein the information representative of the capabilities of the second object identifies a plurality of functions performed by the second object, the method further comprising the first object selecting the at least one function from the plurality of functions.

5. The method according to claim 1, wherein the software module adapted to the first object is obtained directly from the second object or downloaded from an address contained in the information representative of the capabilities of the second object.

6. The method according to claim 1, wherein the data exchanged between the first object and the second object while executing the at least one function at the first object complies with an IP protocol.

7. The method according to claim 1, wherein said information representative of the capabilities of an object comprises:
at least one hardware and/or software resource of the object used for performing its function; and/or
an identifier of the object.

8. The method according to claim 1, wherein data is supplied by the second object to the software module of the first object in response to a request from the software module and/or at the initiative of the second object.

9. The method according to claim 1, further comprising pairing the first object with the second object.

10. The method according to claim 1, further comprising:
on receiving a request, activating the software module so as to execute the function of the second object; and
supplying a response to said request obtained while the software module is executing said function of the second object.

11. The method according to claim 1, further comprising:
updating the information representative of the capabilities of the first object with the function of the second object; and
using the communications network to supply the updated information.

12. A computer having stored thereon a program comprising instructions for executing an updating method when the program is executed by a computer, wherein the updating method is a method of updating the capabilities of a first object connected to a communications network, the method being performed by the first object and comprising:

using the communications network to supply information representative of the capabilities of the first object, the capabilities of the first object comprising capabilities associated with an execution environment of the first object;

receiving via the communications network information representative of the capabilities of a second object connected to the communications network, the information identifying at least one function of the second object, the at least one function being executable at the second object by an execution automaton programmed to make use of the resources of the second object that enable the second object to perform the at least one function; and obtaining a software module adapted to the first object and configured to execute in the execution environment of the first object the at least one function of the second object while using data exchanged with the second object, the software module reproducing service logic of the second object that gives access to the resources of the second object that enable the second object to perform the at least one function at the second object.

13. A non-transitory computer readable data medium having stored thereon a computer program including instructions for executing an updating method when the program is executed by a computer, wherein the updating method is a method of updating the capabilities of a first object connected to a communications network, the method being performed by the first object and comprising:

using the communications network to supply information representative of the capabilities of the first object, the capabilities of the first object comprising capabilities associated with an execution environment of the first object;

receiving via the communications network information representative of the capabilities of a second object connected to the communications network, the information identifying at least one function of the second object, the at least one function being executable at the second object by an execution automaton programmed to use resources of the second object that enable the second object to perform the at least one function; and obtaining a software module adapted to the first object and configured to execute in the execution environment of the first object the at least one function of the second object while using data exchanged with the second object, the software module reproducing service logic of the second object that gives access to the resources of the second object that enable the second object to perform the function at the second object.

14. A method of communicating with a first object performed by a second object, the first and second objects being connected to a communications network, the method comprising:

using the communications network to receive information representative of the capabilities of the first object, the capabilities of the first object comprising capabilities associated with an execution environment of the first object;

using the information representative of the capabilities of the first object to select a software module adapted to the first object and configured to execute in the execution environment of the first object at least one function of the second object while using data exchanged with the second object, said at least one function being executable at the second object by an execution automaton programmed to use resources of the second object that enable the second object to perform sed function, the software module reproducing service logic of the second object that give access to the resources of the second object that enable the second object to perform the function at the second object; and using the communications network to supply information representative of the capabilities of the second object, the information identifying the at least one function of the second object and comprising a reference giving access to the software module adapted to the first object.

15. A device for updating the capabilities of a first object connected to a communications network, the device being integrated in the first object and comprising a processor and a memory, wherein the device is configured to:

use the communications network to supply information representative of the capabilities of the first object, the capabilities of the first object comprising capabilities associated with an execution environment of the first object;

use the communications network to receive information representative of the capabilities of a second object connected to the communications network, the information identifying at least one function of the second object, the at least one function being executable at the second object by an execution automaton programmed to use of the resources of the second object that enable the second object to perform the at least one function; and obtain a software module adapted to the first object and configured to executed in the execution environment of the first object at least one function of the second object while using data exchanged with the second object, the software module reproducing service logic of the second object that gives access to the resources of the second object that enable the second object to perform the function at the second object.

16. A communications device integrated in a second object for communicating with a first object, the first and second objects being connected to a communications network, the communications device being integrated in the second object and comprising a processor and a memory, wherein the device is configured to:

use the communications network to receive information representative of the capabilities of the first object, the capabilities of the first object comprising capabilities associated with the execution environment of the first object;

use the information representative of the capabilities of the first object to select a software module adapted to the first object and configured to execute in the execution environment of the first object at least one function of the second object while using data exchanged with the second object, the software module reproducing service logic of the second object that gives access to the resources of the second object that enable the second object to perform the function at the second object; and use the communications network to supply information representative of the capabilities of the second object, the information identifying the at least one function of the second object and comprising a reference giving access to the software module adapted to the first object.

17. A communications system comprising a plurality of objects connected to a communications network, the communications system comprising:

a first object comprising a device for updating the capabilities of the first object; and a second object comprising a communications device for communicating with the first object, wherein the device for updating the capabilities of the first object is configured to:

use the communications network to supply information representative of the capabilities of the first object, the capabilities of the first object comprising capabilities associated with an execution environment of the first object;

receive via the communications network information representative of the capabilities of the second object, the information identifying at least one function of the second object, the at least one function being executable by an execution automaton programmed to use resources of the second object that enable the second object to perform the at least one function; and obtain a software module adapted to the first object and configured to execute in the execution environment of the first object the at least one function of the second object while using data exchanged with the second object, the software module reproducing service logic of the second object that gives access to the resources of the second object that enable the second object to perform the function at the second object; and wherein the communications device is configured to:

use the communications network to receive the information representative of the capabilities of the first object supplied by the device for updating the capabilities of the first object;

use the information representative of the capabilities of the first object to select the software module adapted to the first object; and use the communications network to supply the information representative of the capabilities of the second object, the information comprising a reference giving access to the software module adapted to the first object.

* * * * *